United States Patent [19]

Hobbel et al.

[11] Patent Number: 5,453,045

[45] Date of Patent: Sep. 26, 1995

[54] SYSTEM FOR TRANSFERRING BIRDS FROM ONE CONVEYOR SYSTEM TO ANOTHER WITH INTERMEDIATE ACCUMULATOR

[75] Inventors: Arend Hobbel, Numansdorp; Walter Minderman, Rotterdam, both of Netherlands

[73] Assignee: Systemate Holland, B.V., Numansdorp, Netherlands

[21] Appl. No.: 312,290

[22] Filed: Sep. 26, 1994

Related U.S. Application Data

[63] Continuation-in-part of Ser. No. 183,284, Jan. 18, 1994, abandoned, which is a continuation-in-part of Ser. No. 6,389, Jan. 21, 1993, Pat. No. 5,340,351.

[51] Int. Cl.⁶ .................................................. A22C 21/00
[52] U.S. Cl. ............................................ 452/182; 452/183
[58] Field of Search ...................................... 452/182, 183, 452/177, 179, 180

[56] References Cited

U.S. PATENT DOCUMENTS

| | | | |
|---|---|---|---|
| 4,178,659 | 12/1979 | Simonds | 17/11 |
| 4,570,295 | 2/1986 | van Mil | 17/11 |
| 4,574,428 | 3/1986 | Meyn | 17/11 |
| 4,675,943 | 6/1987 | Tabata | 17/11 |
| 4,709,448 | 12/1987 | McGuire et al. | 17/11 |
| 4,756,056 | 7/1988 | Innes et al. | 17/11 |
| 4,791,704 | 12/1988 | Chapman | 17/11 |
| 4,813,101 | 3/1989 | Brakels et al. | 17/11 |
| 4,856,144 | 8/1989 | de Greef | 17/24 |
| 5,125,498 | 6/1992 | Meyn | 198/465.4 |
| 5,306,203 | 4/1994 | Martin et al. | 452/182 |
| 5,340,351 | 8/1994 | Minderman | 452/182 |
| 5,344,360 | 9/1994 | Hazenbroek | 452/182 |

FOREIGN PATENT DOCUMENTS 0225306  10/1987  European Pat. Off. ........ A22C/21/00

*Primary Examiner*—Willis Little
*Attorney, Agent, or Firm*—Hopkins & Thomas

[57] ABSTRACT

A system for transferring birds (77) from a weigh line (11) to a cut-up line (12) through an intermediate accumulator. The system comprises a continuously rotating buffer wheel (15) having a plurality of bird carriers (17) slidably mounted on its periphery and being carried on buffer wheel (15) toward either an inlet gate (106) or a delivery gate (114). When a bird carrier (17) arrives at either inlet gate (106) or delivery gate (114), it is stopped by a gate arm (108) or (115), respectively, and remains stationary with respect to the continuously moving buffer wheel (15). When a bird (77) moves along weigh line (11) toward buffer wheel (15), gate arm (108) opens and a first pressure wheel assembly (128) is activated to carry a bird carrier (17) on the periphery of buffer wheel (15) toward a shackle (22) having bird (77) suspended therefrom, to the inlet area (18) whereupon the bird (77) will be transferred from shackle (22) to bird carrier (17), and then be carried on the buffer wheel toward delivery gate (114). Thereafter, when an empty shackle (124) on cut-up line (12) approaches delivery area (20), gate arm (115) is opened and a second pressure wheel assembly (128) is activated to carry a bird carrier (17) having a bird (77) suspended therefrom moves into delivery area (20) so that the bird (77) carried on the bird carrier plate will be transferred to shackle (124) of the cut-up line. Bird carrier plates (17) accumulate and form a queue at both inlet gate (106), and delivery gate (114), respectively.

19 Claims, 8 Drawing Sheets

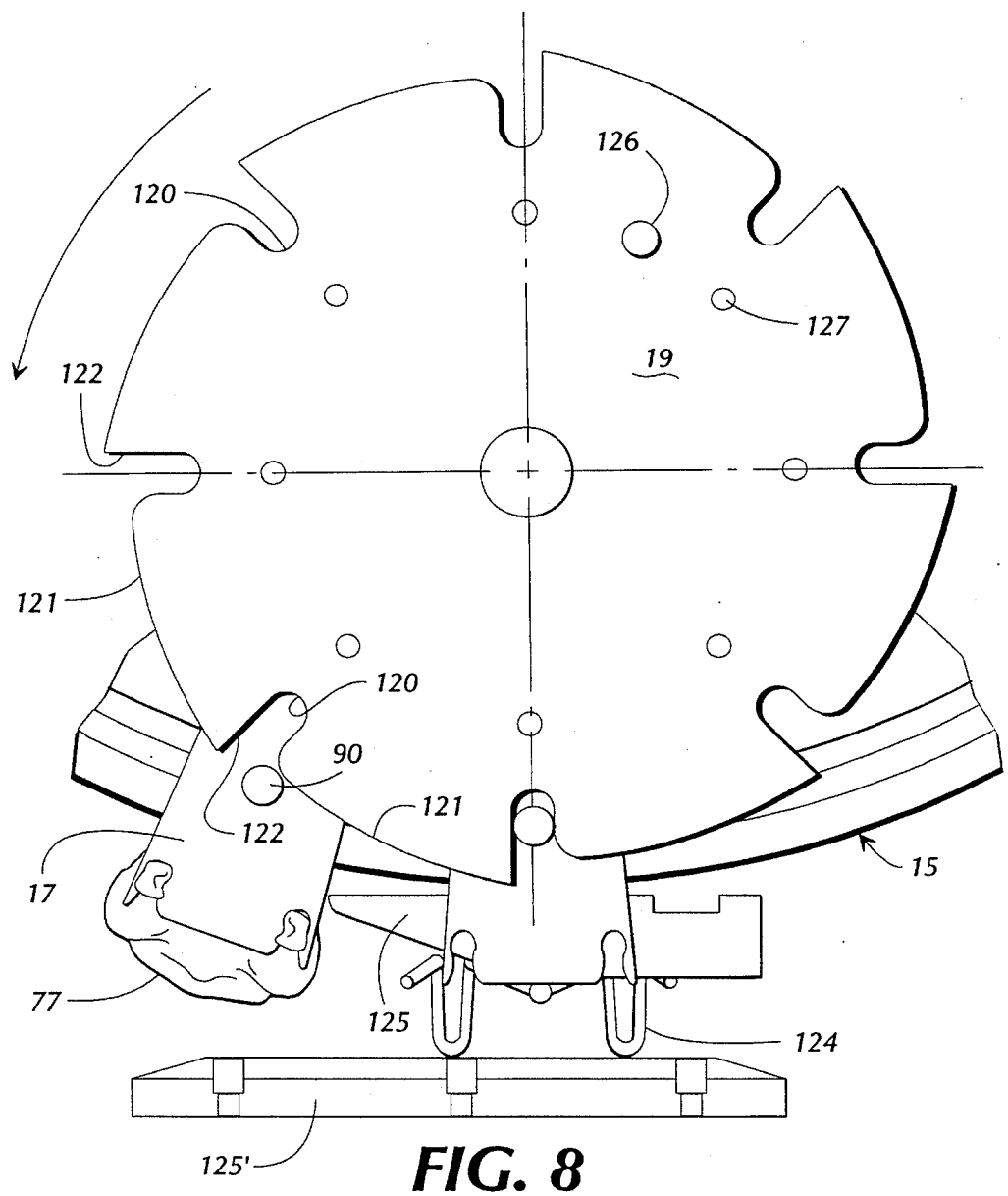
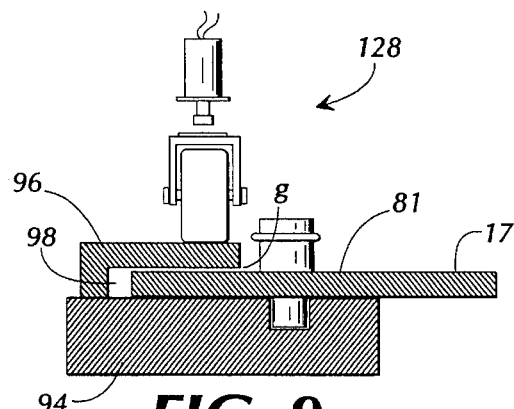
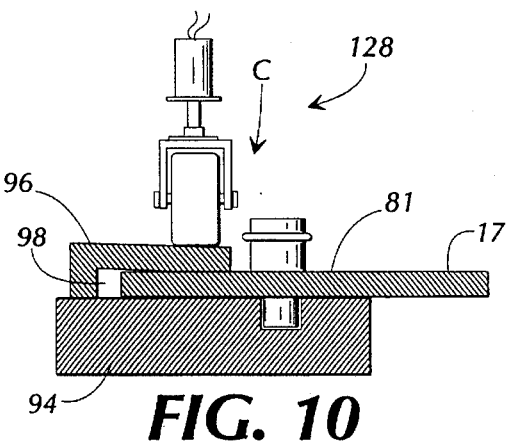

SYSTEM FOR TRANSFERRING BIRDS FROM ONE CONVEYOR SYSTEM TO ANOTHER WITH INTERMEDIATE ACCUMULATOR

CROSS REFERENCE TO RELATED APPLICATION

This is a continuation-in-part of application Ser. No. 08/183,284 filed on Jan. 18, 1994, abandoned, which is a continuation-in-part of application Ser. No. 08/006,389 filed on Jan. 21, 1993, now Pat. No. 5,340,351.

FIELD OF THE INVENTION

The invention relates in general to a poultry conveying system in which poultry carcasses are suspended by their legs on shackles and are moved in series on a suspended conveyor system through a plurality of work stations. More particularly, the invention relates to a method and apparatus for automatically transferring birds from one suspended conveyor system to another suspended conveyor system, while accumulating the birds on a buffer between conveying systems.

BACKGROUND OF THE INVENTION

In the processing of chickens, turkeys and other types of birds through a poultry processing plant for defeathering, evisceration, cut-up and packaging, and for eventual delivery to the retail user, such as a grocery store or fast food restaurant, it is desirable to perform as many of the processing steps as possible with automated machinery. It is important to minimize the manual handling of the birds so as to minimize the expense of processing the birds, as well as to insure uniform processing of the birds.

The prior art poultry processing systems have hung birds by their legs from shackles so that the birds are moved in series in an inverted attitude by a series of shackles along an overhead conveyor system, and the various processing functions have been performed on the birds as they move along the line, such as evisceration, weighing, sorting, and cut-up. However, at certain points in the conveyor system it is desirable to transfer the birds from one conveyor line to another. For example, after the birds have been eviscerated, they can be weighed, and then transferred to separate cut-up lines in accordance with the weights of the birds. Also, the birds may be transported through the evisceration and weighing processes at six inch centers between adjacent birds, whereas the cut-up line may require that the birds be spaced at twelve inch centers. Moreover, the evisceration and weighing lines may operate at a different speed than the cut-up lines.

In the past, the transfer of birds from one conveyor line to another was manually performed by an operator retrieving the birds removed from the shackles of the eviscerator line and rehanging the birds on the shackles of a cut-up line. More recently, equipment has been developed which automatically transfers the birds from one line to another. However, these newer machines are complicated and do not provide a system that is as simple, efficient and reliable as desired by the industry.

Accordingly, a need exists for an improved apparatus and method for automatically transferring birds from one overhead conveyor system to another, particularly when the conveyor systems operate at different speeds or the birds are hung at different spacing on the conveyor lines.

SUMMARY OF THE INVENTION

Briefly described, the present invention comprises a bird transfer system positioned between adjacent overhead poultry conveyor lines, at the end of a first line and at the beginning of a second line. The system includes an independently driven buffer wheel that has a plurality of bird carriers supported on the periphery of the wheel. The bird carriers rest on the periphery of the buffer wheel, moving in unison with the buffer wheel, until the bird carriers are engaged by one of two gates arranged at the periphery of the buffer wheel. The gates block the movement of the bird carriers with the buffer wheel, so that other bird carriers queue up behind the blocked carrier. When a bird is to be received at the entrance area of the buffer wheel from a shackle of the input overhead conveyor line, the gate releases the first carrier in the queue of carriers and a first pressure wheel assembly compresses the buffer wheel and holds the adjacent bird carrier in position on the periphery of the buffer wheel so that the released carrier is moved instantaneously with the buffer wheel through the gate in timed relationship with the shackle of the conveyor line, and is in proper position at the entrance area for receiving the bird from the shackle.

The legs of the birds are urged from the shackle to the carrier on the buffer wheel. With the carrier receiving the legs of the birds in recesses formed in the carrier. Once a bird has been received by the carrier, the carrier continues its movement with the buffer wheel from the entrance area toward the delivery area on the other side of the buffer wheel.

The second gate is located just upstream from the delivery area of the buffer wheel and functions to block the movements of the carriers and their birds so as to form a delivery queue of carriers and birds. When an empty shackle of the receiving conveyor line is detected moving toward the delivery area, the second gate releases the first carrier and its bird from the queue and a second pressure wheel assembly compresses the buffer wheel down onto the bird carrier located adjacent the first bird carrier in the queue so that the buffer wheel instantaneously carries the first carrier and the bird in timed relationship with respect to the receiving shackle into the delivery area, where the bird is urged from the carrier of the buffer wheel into the shackle of the conveyor line. The now empty bird carrier is free to move with the buffer wheel back to the queue at the first gate, while the second bird carrier compressed by the pressure wheel assembly on the buffer wheel is moved into position at the delivery gate.

Entrance and delivery timing wheels are positioned in overlying tangential relationship with respect to the buffer wheel, and the entrance timing wheel is driven by the input conveyor line and the delivery timing wheel is driven by the receiving conveyor line. Both timing wheels include recesses which engage and control the carriers as they move from the gates toward the entrance area or delivery area of the buffer wheel, respectively.

The buffer wheel is independently driven with respect to the two conveyor systems and the peripheral speed of the buffer wheel is higher than the shackles of the two conveyor systems.

Each of the pressure wheel assemblies has a pressure wheel which rides on the buffer wheel, and also includes a one piece flexible tire mounted on the periphery of the wheel to compress the buffer wheel when an automatically activated cylinder extends a rod down onto the bracket supporting each pressure wheel.

Each bird carrier includes a substantially flat carrier plate resting on the perimeter portion of the buffer wheel, and each carrier plate has notches at one edge which function to receive the legs of the birds. Each carrier plate includes a downwardly projecting guide block that is received in an upwardly facing annular slot extending about the peripheral portion of the buffer wheel. The annular slot functions as an annular guide means. Each bird carrier includes an upwardly extending timing post that is engaged by the recesses of the timing wheels. Each bird carrier rests on the upper surface of the buffer wheel, and the friction between each bird carrier and the buffer wheel causes each bird carrier to tend to remain stationary on the moving buffer wheel, so that the bird carriers are moved in unison with the buffer wheel. However, when a bird carrier is engaged by one of the two gates positioned upstream of the receiving area and delivery area, the gate stops the movement of the bird carrier while the buffer wheel continues to move beneath and partially above the bird carrier. This results in the bird carders at each gate sliding with respect to the buffer wheel. Oncoming bird carriers then engage the stopped bird carrier at the gate, and queue up behind the stopped bird carrier.

Thus, it is an object of this invention to provide an improved system for transferring birds from one conveyor system to another conveyor system.

It is another object of this invention to provide a bird transfer system which utilizes an independently driven buffer means between an input conveyor and the receiving conveyor which has the ability to receive birds at one speed and at one spacing between birds, and to deliver the birds to the receiving conveyor which receives the birds at speeds and spacings which may differ from the first conveyor.

Another object of this invention is to provide an improved bird transfer means for transferring birds from the shackles of one overhead conveyor system to the shackles of another overhead conveyor system, and which can accumulate birds between the conveyor systems and deliver the birds in timed relationship to the receiving conveyor system.

Another object of this invention is to provide an improved buffer wheel for use between overhead conveyor systems for transferring a greater number of birds at an increased transfer rate from the shackles of one system to the shackles of another system, and which carries a plurality of bird carriers at its periphery for receiving the birds and delivering the birds, with gates for controlling the movements of the bird carriers to the receiving area and to the delivery area about the buffer wheel.

Another object of this invention is to provide an improved transfer system between the delivery end of one overhead conveyor system and the receiving end of another overhead conveyor system, which includes an independently driven buffer wheel which has the ability to accumulate and to control the movements of bird carriers between the conveyors, the system being reliable in operation, not harmful to the birds being handled by the system, and inexpensive to maintain.

Other objects, features and advantages of the present invention will become apparent upon reading the following specification, when taken in conjunction with the accompanying drawings.

BRIEF DESCRIPTION OF THE DRAWINGS

FIG. 8 is a plan view of the delivery timing wheel.

FIG. 9 is a cross sectioned elevational view of the pressure wheel and the buffer wheel when a bird carrier is held at either the inlet or delivery gate.

FIG. 10 is a cross sectioned elevational view of the pressure wheel and the buffer wheel when a bird carrier is released at either the inlet or delivery gate.

DETAILED DESCRIPTION

Figure 1:
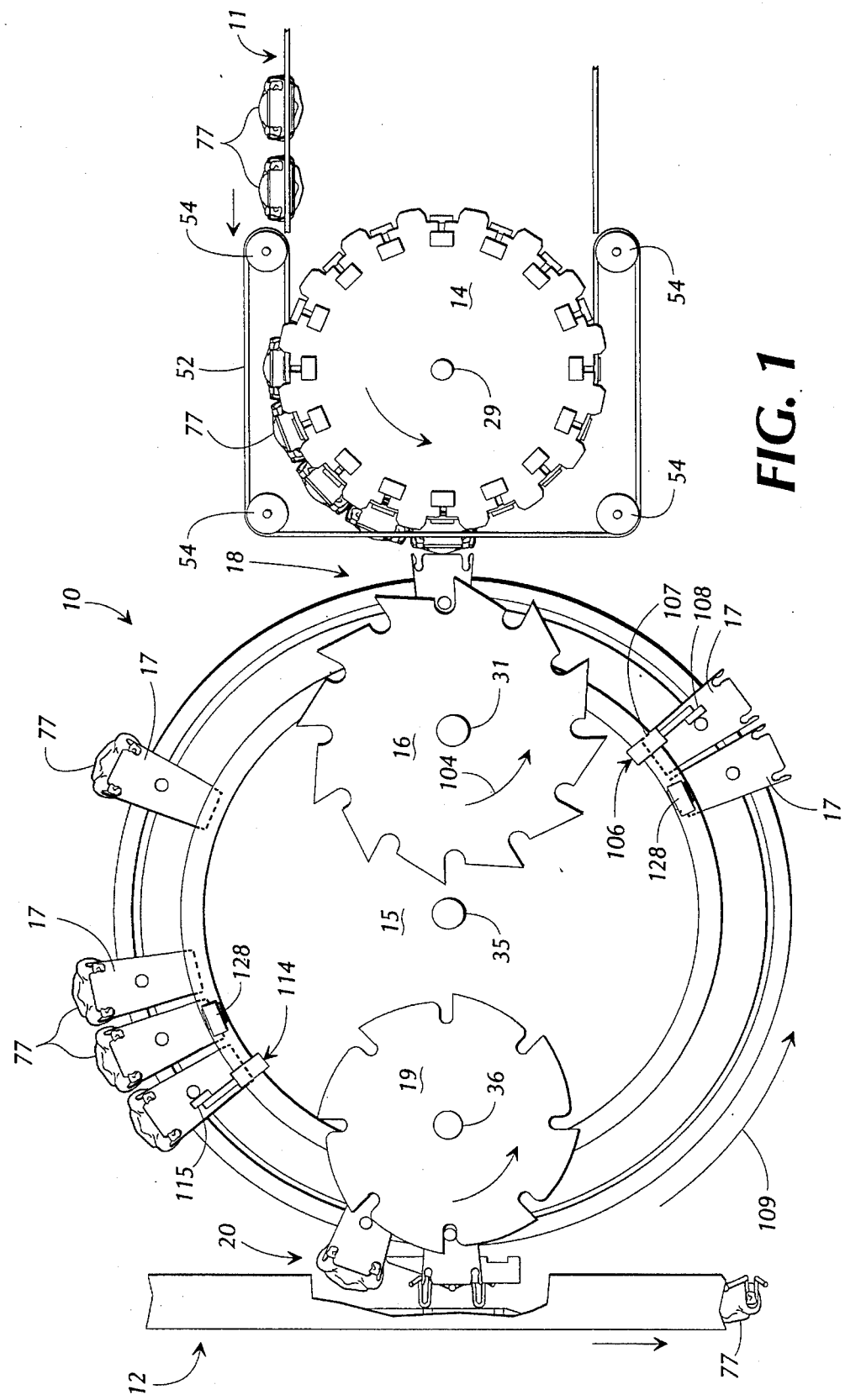
FIG. 1 is a plan view of the working level of the bird transfer system.

Referring now in more detail to the drawings in which like numerals indicate like parts throughout the several views, FIG. 1 illustrates the bird transfer system in a schematic form at the working level of the system. The bird transfer system 10 is located between a delivery line 11 and a receiving line 12, both of which move a plurality of bird-carrying shackles in series. For example, the delivery line 11 would carry birds through an eviscerator line and through a weigh line where the whole, oven-ready birds are weighed for subsequent sorting at the delivery end of the delivery line 11. The receiving line 12 would be one of several cut-up lines for birds of differing weight which receive the birds from different ones of the bird transfer systems and which carry the oven-ready birds through several cut-up stages where the bird carcasses are divided into the parts and pieces as required by the customer.

FIG. 1 illustrates the delivery wheel 14 at the delivery end of the delivery line 11, the buffer wheel 15, the inlet timing wheel 16 which is substantially smaller in diameter than the buffer wheel 15 and which is in overlying peripheral alignment with the buffer wheel at the inlet area 18 of the buffer wheel, and the delivery timing wheel 19 which is also smaller than the buffer wheel 10 and which is also in overlying peripheral alignment with the buffer wheel at the delivery area 20 of the buffer wheel. Buffer wheel 15 carries at its perimeter a plurality of randomly spaced bird carriers 17.

Figure 2:
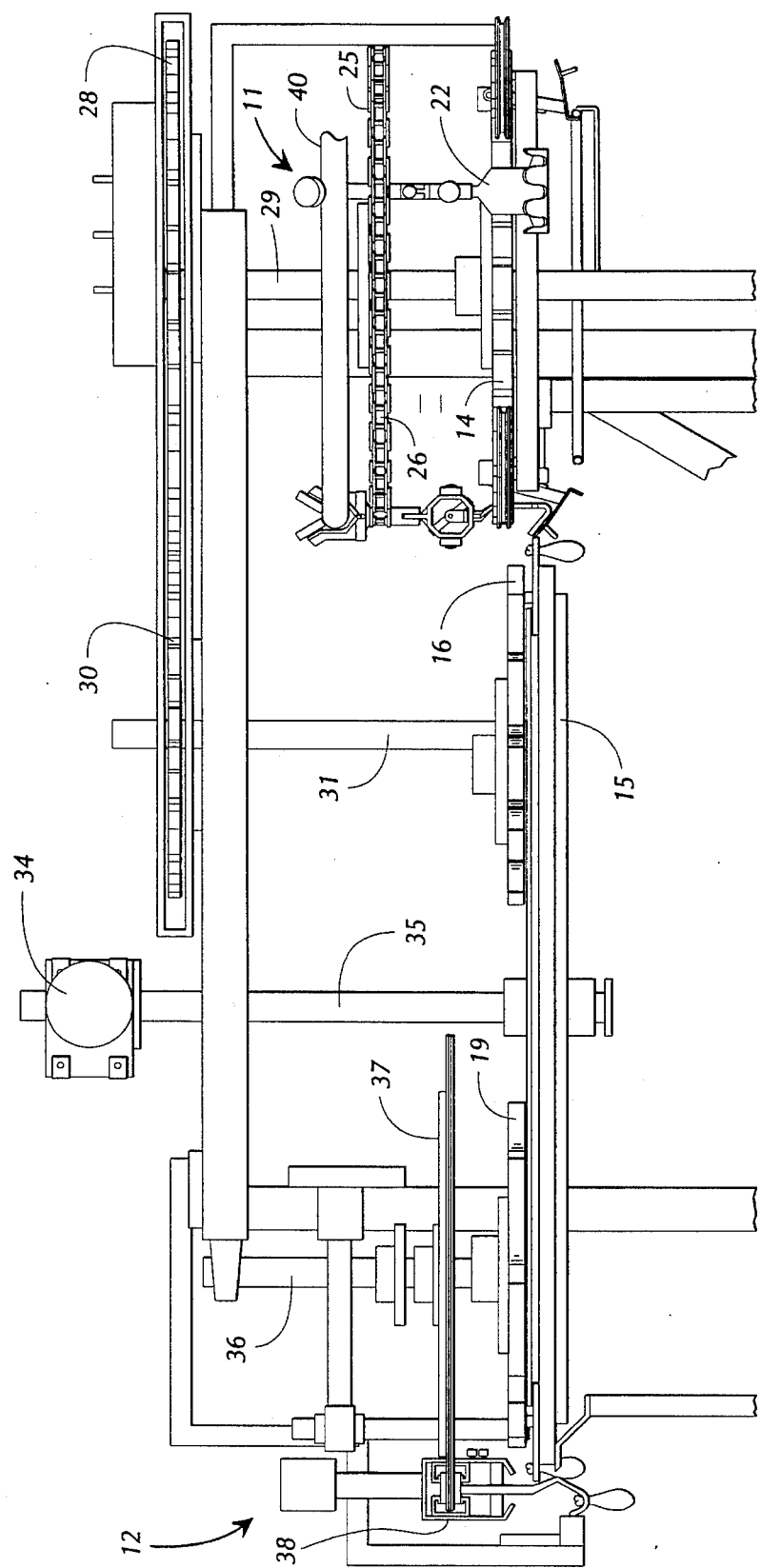
FIG. 2 is side elevational view of the bird transfer system.

As illustrated in FIG. 2, the delivery line 11 moves its shackles 22 in series along a shackle transfer bar 40 about the delivery wheel 14. The conveyor driving chain 25 extends about driving wheel 26 and functions to rotate driving wheel 26. The rotary movement applied to the driving wheel 26 also drives delivery wheel 14 as well as timing sprocket 28 through the common vertical shaft 29.

Inlet timing wheel 16 is connected to the upper timing sprocket 30 through vertical shaft 31, so that the timing sprocket 30 and inlet timing wheel 16 rotate in unison. The timing sprockets 28 and 30 are engaged with each other at their peripheries, so that inlet timing wheel 16 rotates in timed relationship with delivery wheel 14 of the delivery line 11.

Motor 34 drives vertical shaft 35 which is connected to the buffer wheel 15. Therefore, buffer wheel 15 is independently driven, usually at a higher peripheral velocity, with respect to the delivery wheel 14 of the delivery line 11.

Delivery timing wheel 19 is mounted to vertical shaft 36. Timing sprocket 37 is also mounted to vertical shaft 36, and timing sprocket 37 is driven by the shackle chain 38 of the receiving line 12. With this arrangement, the delivery timing wheel 19 is always driven in timed relationship with respect to the movement of the bird support shackles of the receiving line 12.

Figure 3A:
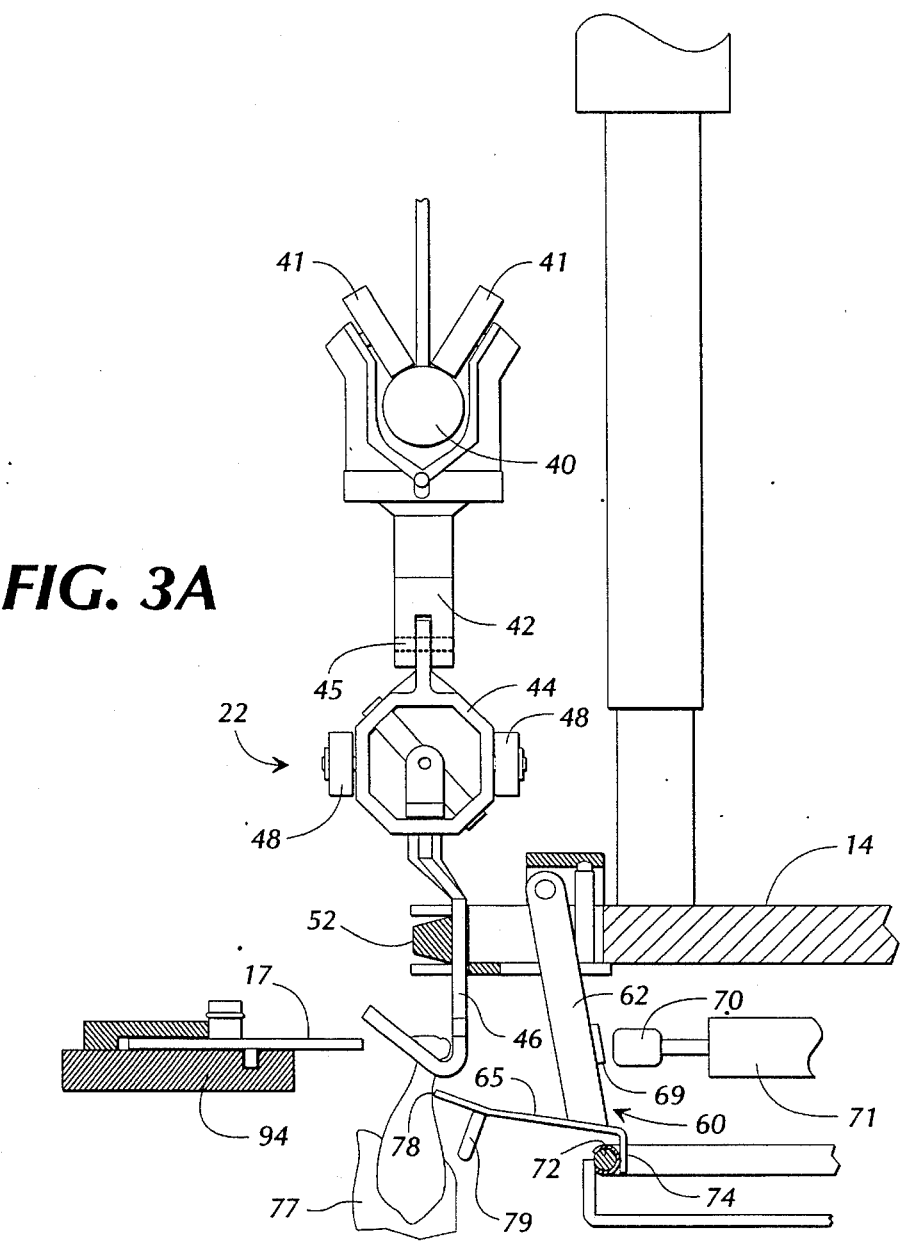
FIG. 3A is a side elevational view of the weigh shackle as it is received between the weigh conveyor and the bird transfer system.
Figure 3B:
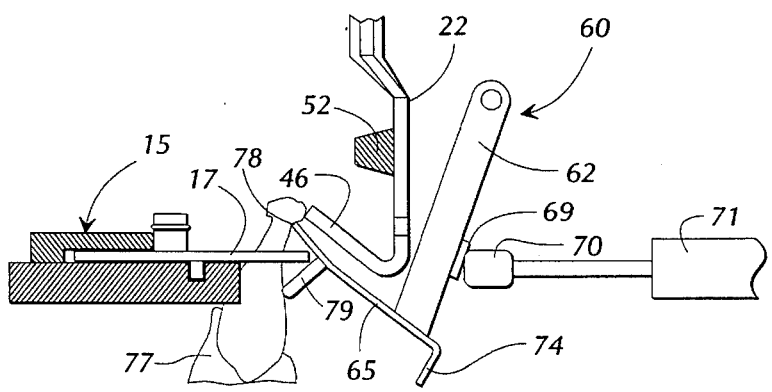
FIG. 3B shows the transfer boot of FIG. 3A in its tilted position as it urges a bird from the shackle to a bird carrier.
Figure 4:
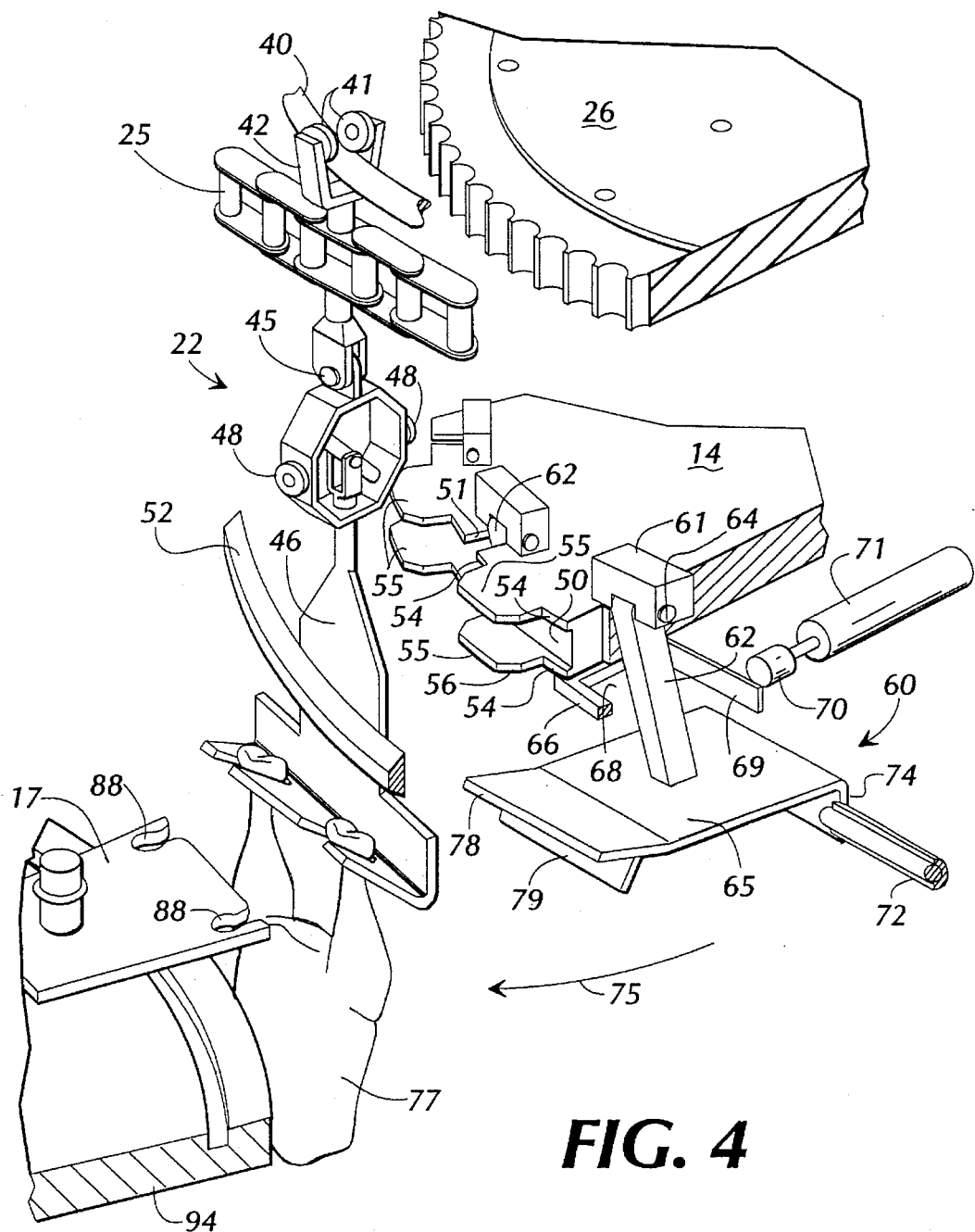
FIG. 4 is an expanded perspective illustration of a portion of the delivery end of the weigh conveyor line, showing the weigh shackle expanded outwardly from the chain drive wheel and the divided wheel.

As illustrated in FIGS. 3 and 4, shackles 22 move from the weigh line about the perimeter of the delivery wheel 14 along the shackle transport bar 40. Each shackle 22 is, in this embodiment of the invention, a specially designed weigh shackle that includes upper transport wheels 41 that ride along the shackle transport bar, the support yoke 42 that is suspended from the transport wheels 41, a tiltable support frame 44 that tilts about pivot pin 45 and bird support plate 46 that is suspended from the tiltable support frame 44. Lifting wheels 48 are attached to the support frame 44 for the purpose of riding up a weigh scale so that the weigh scale weighs only the bird, the support frame, and the bird support plate suspended from the wheels 48. The details of this feature of the invention are disclosed in copending U.S. application Ser. No. 08/184,491.

As illustrated in FIG. 4, delivery wheel 14 has a peripheral groove 50 which is interrupted at equally spaced intervals about its perimeter by vertical slots 51. The slots are spaced apart at intervals corresponding to the spacing of the shackles 22 along the delivery line 11. Shackle clamping band 52 is aligned with and received in groove 50. Shackle clamping band 52 extends about alignment pulleys 54 (FIG. 1), so that the band 52 is continuously guided into and taken away from the peripheral groove 50 in response to rotation of the delivery wheel 14. Shackle clamping band 52 is arranged outboard of the shackles 22 to urge the bird support plate 46 of each shackle into flat abutment with the perimeter of the delivery wheel 14.

The perimeter of the delivery wheel 14 is formed with flattened receiving surfaces 54 which straddle both the vertical slots 51 and the peripheral groove 50, forming a seat for bird support plate 46 of the shackles 22. Adjacent protrusions 55 form sloped surfaces 56 which tend to guide the edge portions of the bird support plate 46 into registration with the flattened receiving surfaces 54. This causes each shackle 22 to be aligned with a vertical slot 51 of the delivery wheel 14.

A transfer boot 60 is mounted to delivery wheel 14 at each vertical slot 51. Each transfer boot 60 includes a support block 61 mounted over slot 51, leg 62 pivotally connected at its upper portion by a pivot pin 64 to support block 61 and pusher plate 65 mounted to the lower end of leg 62. Leg 62 extends downwardly through slot 51. Limiting plate 66 is mounted to the lower surface of delivery wheel 14 and defines a slot 68 therein, and leg 62 extends through slot 68. Limiting plate 66 limits the distance that the leg 62 of transfer boot 60 can move outwardly of the vertical slot 51. A bumper bar 69 is rigidly mounted to the rearwardly facing surface of leg 62 for engagement by the bumper 70 of the stationary pneumatic cylinder 71.

Pusher plate 65 of the transfer boot 60 is normally held in its retracted position as illustrated in FIG. 3 and 4 by a semicircular restraining rod 72. Each pusher plate 65 is an inverted L-shape, with a downwardly extending tab 74 that slides along restraining rod 72. When a pusher plate 65 reaches the opening in the semicircular restraining rod 72, it moves in front of cylinder 71, and the cylinder moves its bumper 70 into engagement with the bumper bar 69 of the transfer boot 60, causing the pusher plate 65 to move in an arc as indicated by arrow 75 outwardly beneath bird support plate 46 of a shackle 22 and into engagement with a bird 77 being carried by the shackle. The leading edge 78 of the pusher plate 65 is tilted upwardly with respect to the main body portion of the pusher plate so as to conform with the configuration of the bird support plate 46, so as to engage the legs of the bird 77 adjacent the knuckles of the legs, just beneath the bird support plate 46. U-shaped pusher bar 79 also engages the legs of bird 77 below the knuckles of the legs, and the pusher bar 79 and leading edge 78 of the pusher plate push at levels above and below the bird carrier 17, so as to assure that the leg is urged into the bird carrier at levels above and below the bird carrier, avoiding any tilting motion of the legs of the bird during the transfer process.

After the bird 77 has been transferred by the transfer boot 60 to one of the carriers 17 of the buffer wheel, the cylinder 71 retracts to allow the transfer boot to pivot back to its position illustrated in FIGS. 3A and 4, whereupon the semicircular restraining rod 72 captures the downwardly extending tab 74 of the pusher plate 65, holding the transfer boot in its retracted position. In the meantime, the shackle 22 from which the bird 77 was transferred returns to the weigh line (not shown).

Figure 5:
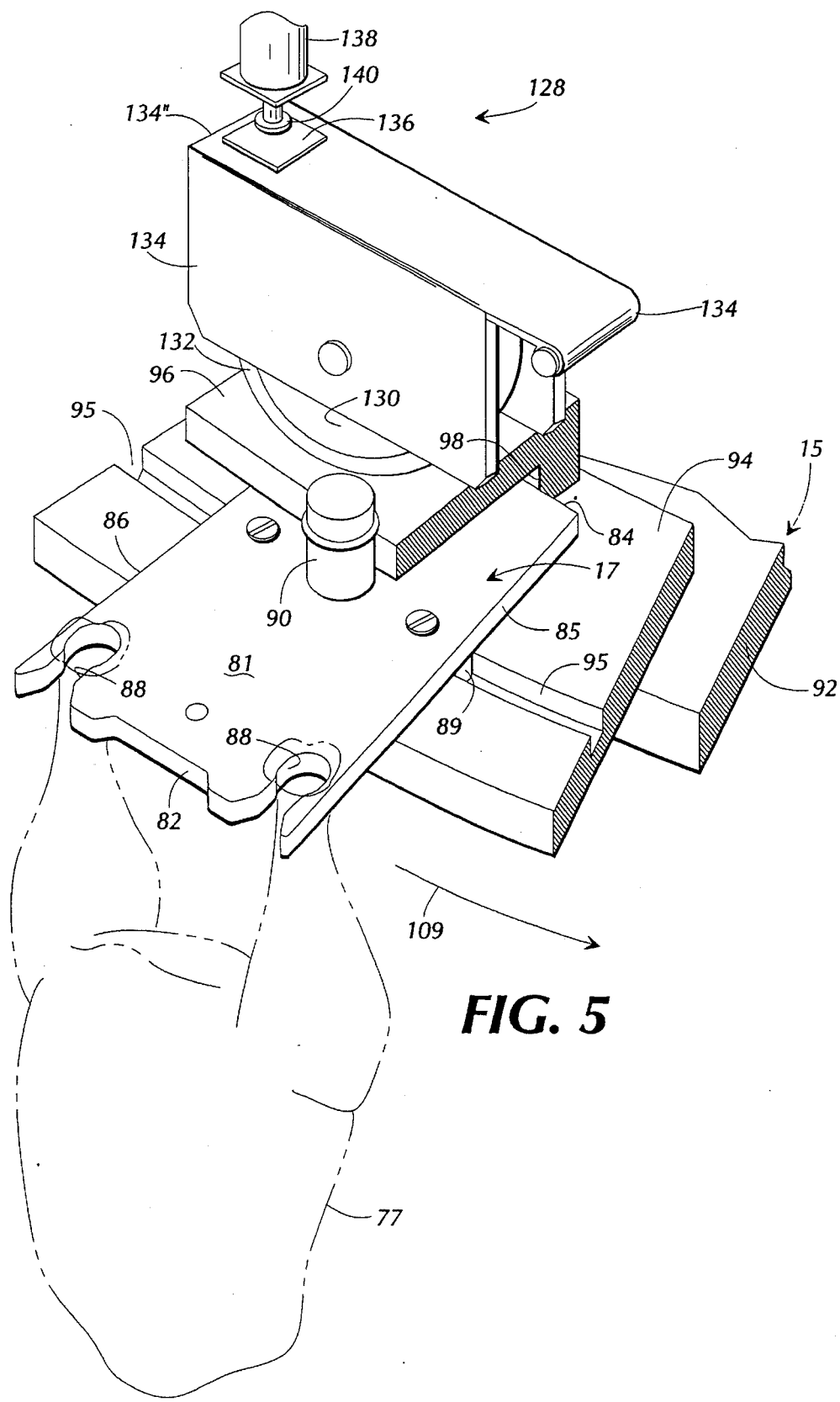
FIG. 5 is a detailed perspective illustration of a pressure wheel assembly and a peripheral portion of the buffer wheel assembly, showing one of the bird carriers fitted to the perimeter of the buffer wheel assembly.

As best illustrated in FIG. 5, each bird carrier 17 comprises a carrier plate 81 that is substantially flat and of uniform thickness, and which includes outer edge 82, inner edge 84 and opposed side edges 85 and 86. A pair of spaced leg receiving recesses 88 are formed in the outer edge 82. An elongated guide block 89 is mounted to the bottom surface (not shown), and a timing post 90 is mounted to the top surface.

Buffer wheel 15 includes a base plate 92 that is mounted to the vertical shaft 35 (FIG. 2), and a perimeter ring 94 is mounted to and overlies the perimeter edge of base plate 92. An upwardly facing annular guide slot 95 extends about perimeter ring 94, and the guide block 89 that extends downwardly from the carrier plate 81 of each bird carrier 17 rides in guide slot 95. Annular guide slot 95 functions as an annular guide means for each of bird carriers 17 on buffer wheel 15. This maintains the bird carrier 17 in proper orientation with respect to the perimeter ring 94.

Locking ring 96 is mounted on perimeter ring 94 and forms an outwardly facing annular guide slot 98 for receiving the inner edge portion 84 of the carrier plate 81. As with annular guide slot 95, annular guide slot 98 also functions as an annular guide means for bird carriers 17. Locking ring 96 is rigidly mounted to perimeter ring 94, and the arrangement of the annular guide slot 95 and outwardly facing guide slot 98 with respect to the inner edge 84 and guide block 89 of the carrier plate 81 causes the carrier plate to be slidably retained at the periphery of the buffer wheel 15.

Still referring to FIG. 5, a pressure wheel assembly 128 is illustrated. Pressure wheel assembly 128 has a pressure wheel 130 with a one piece flexible tire 132 mounted on the outer peripheral surface of the wheel. Pressure wheel 130 rides on the top surface of locking ring 96. Pressure wheel 130 is supported by a bracket 134 that carries wheel 130 on buffer wheel 15. Bracket 134 has a first end 134' pivotally fastened to the frame (not illustrated) of the transfer machine, and a second end 134" having a pad 136 formed or attached to its top surface. Cylinder 138 is supported above pad 136 so that cylinder rod 140 is in registry with pad 136. When cylinder 138 is activated, rod 140 extends downward onto pad 136 to yieldably compress tire 132 on locking ring 96. Tire 132 is made of polyethylene or any other durable plastic or rubber material which has the ability to be compressed. Similarly, locking ring 96 of buffer wheel 15 is made of polyethylene, or any other rigid plastic material approved for use in poultry processing applications, and capable of being yieldably deformed, or compressed, in response to the compression of pressure wheel 130 by cylinder 138. Cylinder 138 can be either a pneumatic or hydraulic cylinder. Cylinder 138 is shown here as a pneumatic cylinder.

Figure 6:
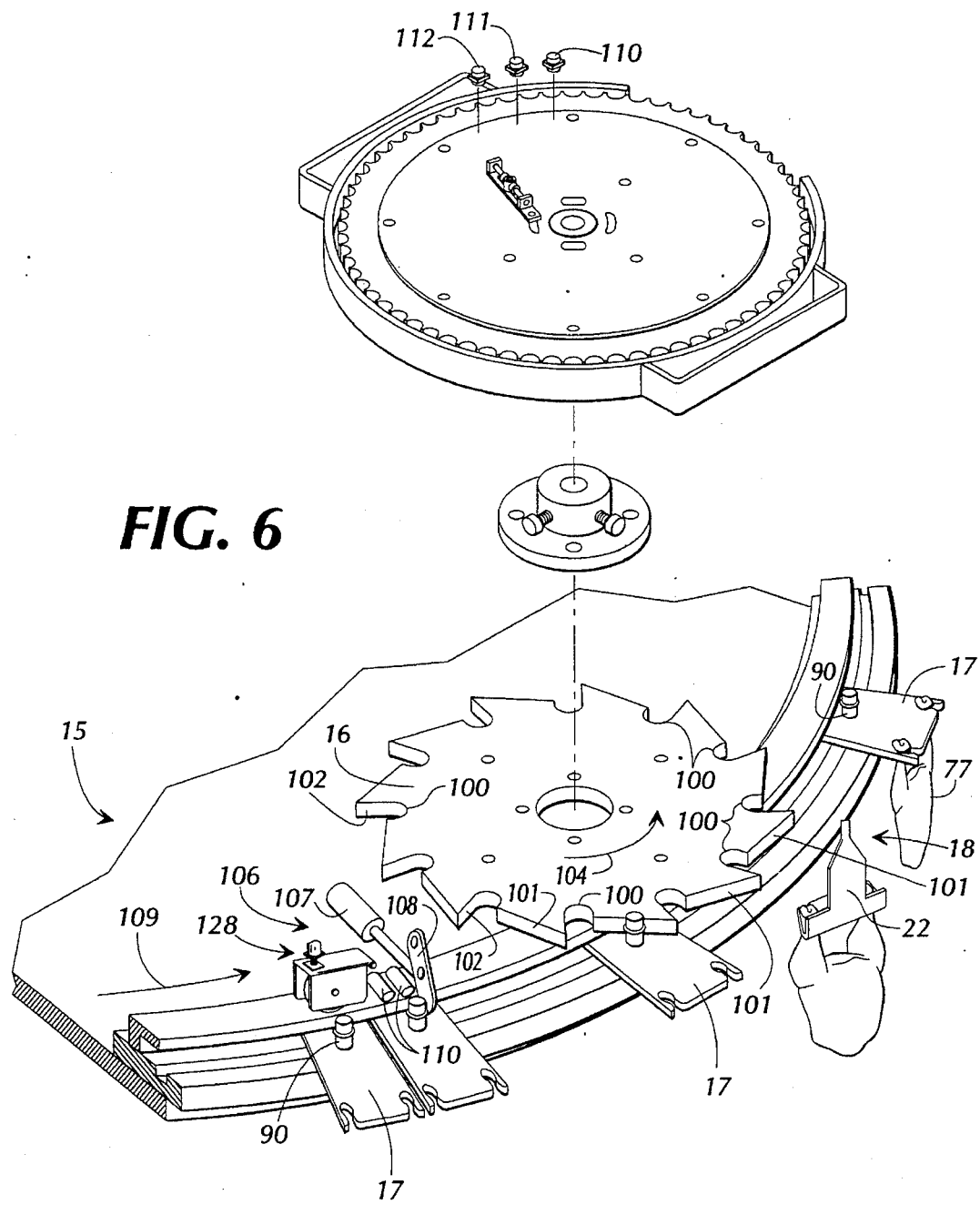
FIG. 6 is a perspective illustration of a potion of the buffer wheel and the timing wheel at the entrance area of the buffer wheel.

As best illustrated in FIG. 6, inlet timing wheel 16 is placed in overlying, peripheral alignment with respect to buffer wheel 15, with the aligned portions of their peripheries rotating in a common direction. Inlet timing wheel 16 includes at its periphery a series of equally spaced timing slots 100, and sloped peripheral wall sections 101 which are angled inwardly from one timing slot 100 to the next adjacent timing slot 100. A radially extending pusher wall 102 merges with each slot 100 and faces in the direction of movement of the timing wheel as indicated by direction arrow 104.

Inlet gate 106 is mounted at the periphery of the buffer wheel 15, upstream of the inlet timing wheel 16. Gate 106 comprises a cylinder 107 and a pivotable gate element 108 that swings out into the path of the timing post 90 of the bird carrier 17, so as to stop the movement of the bird carrier on the moving buffer wheel 15. Thus, as the buffer wheel continuously moves as indicated by direction arrow 109, the gate 106 stops the movement of the oncoming bird carrier 17 and the next oncoming bird carriers begin to engage and queue up behind the stopped bird carrier at the gate 106.

A pair of detection switches 110 are located at gate 106, with one of the detection switches 110 detecting the presence of a timing post 90 of a bird carrier 17 on one side of the gate, and the other detection switch 110 detecting the presence of a timing post as it is moved beyond the gate 106.

As illustrated in FIG. 6, when a carrier 17 is released by gate 106, by the cylinder 107 retracting the gate arm 108 out of the way of the timing post of the carrier, the carriers 17 blocked at the gate begin to move with the buffer wheel 15, so that the first carrier at the gate begins to move to the inlet area 18. However, since buffer wheel 15 is moving in the direction of arrow 109 while bird carrier 17 has been held stationary with respect to the buffer wheel, an inertial lag caused by the sliding of the bird carrier on the buffer wheel can result before the bird carrier attains the same peripheral speed as the buffer wheel. To overcome this lag, pressure wheel 130 is activated simultaneously with gate 108 so that cylinder 138 extends rod 140 downward onto pad 136 of bracket 134 (FIG. 10). Once cylinder rod 140 has been extended, pressure wheel tire 132 yieldably compresses locking ring 96 down onto carrier plate 81 held in annular guide slot 98. Pressure wheel 130 acts on the bird carrier held in the queue of bird carriers adjacent the bird carrier to be moved through gate 108 to urge the bird carrier into engagement with the buffer wheel. Accordingly, once the gate opens and as the pressure wheel compresses the locking ring, the bird carrier is urged into engagement with buffer wheel 15 and propelled or pushed through gate 108 by the adjacent bird carrier. In this manner bird carrier 17 is moved through gate 108 and instantaneously attains the same peripheral speed as buffer wheel 15 at its perimeter ring 94.

Once the carrier has passed the second of the two detection switches 110, the cylinder 107 moves the gate back into blocking relationship with the next oncoming bird carrier 17 while cylinder rod 140 is retracted back into cylinder 138, and locking ring 96 returns to its uncompressed position. In the meantime, the first released bird carrier 17 moves partially beneath inlet timing wheel 16. As the timing post approaches the inlet timing wheel 16, typically it engages the sloped peripheral wall section 101 of the timing wheel, which slows the movement of the carrier until the timing slot 100 catches up with the timing post, whereupon the timing post becomes seeded in the timing slot 100.

In the meantime, a bird 77 is moved by its shackle 22 to the inlet area in timed relationship with respect to the bird carrier 17. Once both the bird 77 and its shackle 22 as well as the carrier 17 are properly moving through the inlet area 18, the transfer boot 60 (FIGS. 3A, 3B, and 4) engages the legs of the bird and pushes the legs of the bird from the shackle 22 into the receiving recesses 88 of the bird carrier.

After the bird has been transferred to the bird carrier at the inlet timing wheel 16, the now empty shackle returns to the weigh line, and the bird carrier 17 moves the bird 77 about the buffer wheel. The inlet timing wheel 16 releases the timing post 90, so that the bird carrier 17 rests in a fixed position on the buffer wheel 15 as the buffer wheel continues to rotate.

Figure 7:
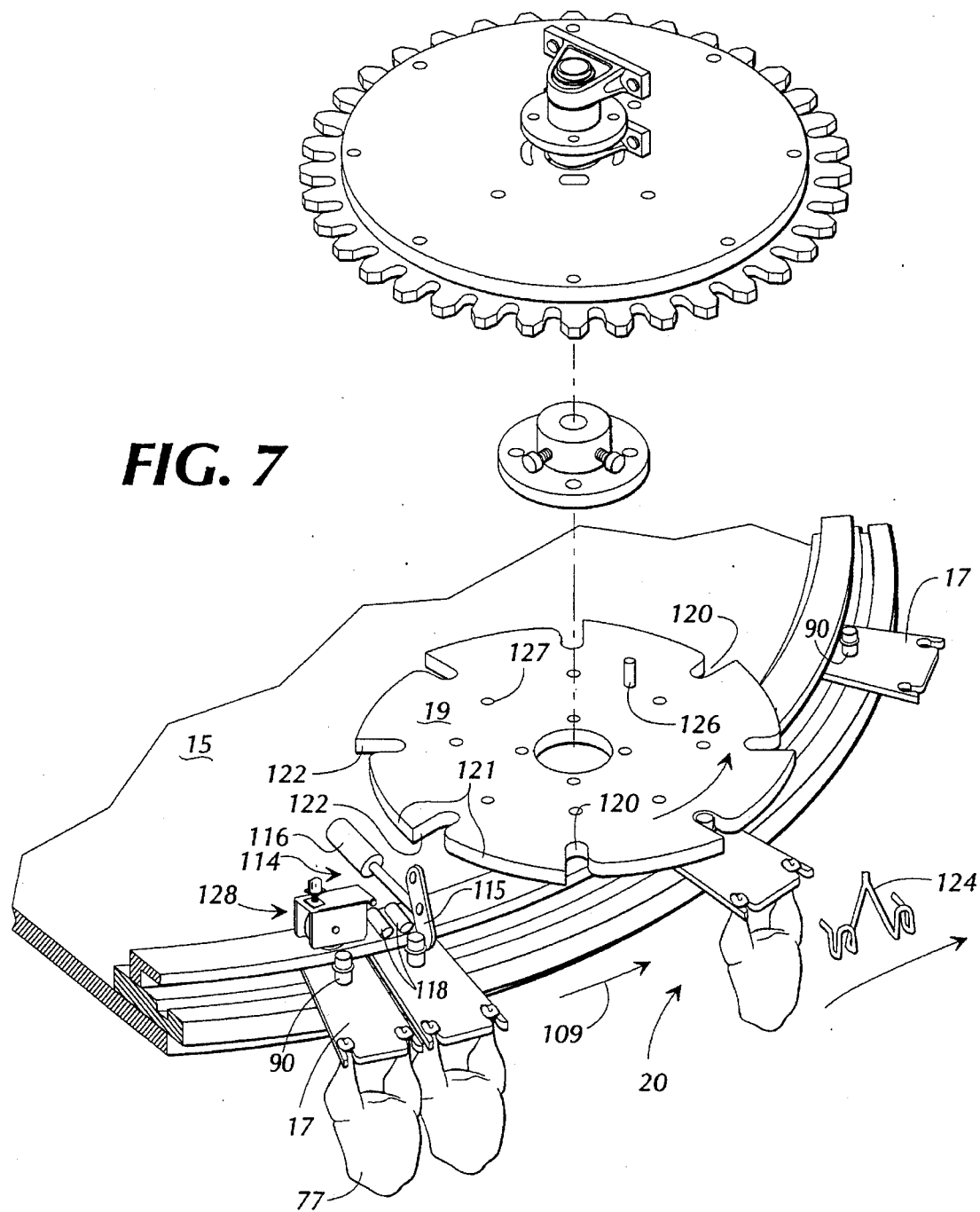
FIG. 7 is a partial perspective illustration, similar to FIG. 6 but showing the timing wheel at the delivery area of the buffer wheel.

FIGS. 7 and 8 illustrate the delivery timing wheel 19 at the opposite side of the buffer wheel from the inlet timing wheel 16. Delivery timing wheel 19 is generally similar in shape to inlet timing wheel 16, and functions in a similar manner. Delivery gate 114 is positioned upstream of delivery timing wheel 19 and delivery area 20, and like gate 106, delivery gate 114 includes a gate arm 115 actuated by a cylinder 116, which moves the gate arm back and forth between positions that block and release the timing posts of the bird carriers 17. Delivery gate 114 also has a pressure wheel assembly 128 that is identically configured to, and acts in the same manner as, the pressure wheel assembly at inlet gate 106. Detection switches 118 detect the presence of the timing posts just upstream and just downstream of the gate arm 115, to detect the presence of a carrier at the gate and the movement of a carrier beyond the gate.

Like the inlet timing wheel 16, the delivery timing wheel 19 has a series of timing slots 120 equally spaced about its perimeter, sloped peripheral wall sections 121 angled inwardly from one slot 120 to the next adjacent slot 120, with a radially extending pusher wall 122 projecting outwardly from each slot and intersecting the peripheral wall section 121. When a carrier 17 is released by delivery gate 114, the second pressure wheel assembly 128 is activated, and the carrier moves with the buffer wheel 15 and is received in a timing slot 120, usually with the peripheral wall section 121 guiding the timing post 90 into the timing slot 120. The timing slots 120 of the delivery timing wheel move in timed relationship with respect to the shackle 124 of the cut-up line, so that the shackle and the carrier meet at the delivery area 20 of the buffer wheel 15.

As illustrated in FIG. 8, a leg discharge cam 125 is located in the path of the legs of each bird 77 moving with a carrier 17, and functions to push the legs of the bird out of its carrier 17 and into the shackle 124 of the cut-up line. Opposing cam surface 125' stabilizes the shackle 124 during this transfer function.

A detection switch 126 is suspended over delivery timing wheel 19 and detects the movement therebeneath of metal inserts or screws 127. This results in the computer system that controls the bird transfer system knowing the position of the delivery timing wheel 19 with respect to bird carrier 17 and shackles 124 on cut-up line 12.

Likewise, detection switches 111, 112, and 113 are mounted over delivery wheel 14 for reading the position of the delivery wheel and shackles 22 suspended thereon. Detection switch 111 reads the position of the wheel and in response thereto, the computer system opens the gate 106 upstream of the outlet timing wheel 16, and signals the first pressure wheel assembly 128. A second detection switch 112 reads the position of the wheel 14 and in response thereto the computer actuates the bumper cylinder 71 to transfer a bird 77 from the delivery wheel 14 to the buffer wheel 15. The third detection switch 113 reads the position of wheel 14 and in response thereto the computer retracts the bumper cylinder 71 (FIGS. 3A and 3B). Those skilled in the art will understand that detection switches 110, 111, 112, 113, 118 and 126 shown in the drawings can be photocells, magnetic field switches, or other electronic signalling devices used to signal an event or the passing of a designated marker.

FIG. 9 illustrates a cross sectioned elevational view of a bird carrier 17 held at either gate 106 or 114 while buffer wheel 15 is moving. Here, bird carrier 17 is sliding on the top surface of perimeter ring 94 of buffer wheel 15 while the bird carrier immediately in front of the carrier shown is also sliding on the buffer wheel and is blocked at the gate. Simultaneously, there is a gap g between the top surface of carrier plate 81 and the bottom surface of locking ring 96 as bird carrier 17 slides on the buffer wheel. Pressure wheel 130 and its tire 132 ride on the top surface of locking ring 96, while at the same time cylinder 138 and cylinder rod 140 are positioned above pad 136 of bracket 134.

Turning now to FIG. 10, gate arm 108 or 115, respectively, has been opened to permit bird carrier 17 to move toward inlet timing wheel 16, or delivery timing wheel 19, respectively. To overcome the inertial lag between bird carrier 17 and buffer wheel 15, cylinder 138 has been activated, driving cylinder rod 140 downward in the direction of arrow c onto pad 136 of bracket 134. When this happens, tire 132 of pressure wheel 130 is compressed and also acts to yieldably compress locking ring 96 onto carrier plate 81 so that gap g no longer exists. This results in the compression of locking ring 96 on the bird carrier adjacent the bird carrier to be moved through the gate, urging the adjacent bird carrier into engagement with buffer wheel 15, whereupon the compressed bird carrier no longer slides relative to perimeter ring 94 of the buffer wheel, thus moving the first bird carrier 17 stationed at the gate through the gate. Bird carrier plate 17 thus not only overcomes the inertial lag of the buffer wheel, it also instantaneously attains the same peripheral speed as buffer wheel 15 and is carried into either inlet area 18 or delivery area 20, respectively.

OPERATION

When the poultry processing lines are in operation, the delivery line 11 which usually extends from a weigh line delivers bird 77 to the delivery wheel 14 of the weigh line (FIG. 1). The shackle clamping band 52 presses each shackle into engagement with a flattened receiving surface 54 of the delivery wheel, so that each shackle 22 is properly positioned at the periphery of the delivery wheel.

As each bird 77 moves about delivery wheel 14, the position of the delivery wheel is detected by photocells 111, 112, and 113. When the first photocell 111 detects the wheel in the right position, the computer actuates the first pressure wheel assembly 128 and inlet gate 106 to release the first bird carrier 17, detected at the inlet gate by detection switch 110, so that the bird carrier is free to rotate with the buffer wheel 15. The bird carrier moves in timed relationship to the inlet area 18 and arrives at the inlet area in timed relationship with the bird 77. The second detection switch 110 determines when the bird carrier has passed through the gate, causing the cylinder 107 to push the gate arm 108 back in the path of the next oncoming carrier to close inlet gate 106, and deactivates the first pressure wheel assembly 128.

In the meantime, the inlet timing wheel 16 captures the timing post 90 in one of the timing slots 100, so that the bird carrier 17 is properly positioned in the inlet area 18 when the bird arrives at the inlet area. The bumper cylinder 71 (FIGS. 3A and 3B) pushes the transfer boot beneath the shackle 22, and the edge 78 and U-bar 79 push the bird legs of the bird 77 upwardly and laterally off the shackle 22 and into the bird receiving recesses 88 of the carrier 17.

Once the bird has been transferred to the bird carrier 17, the bird carrier freely rests on the buffer wheel 15, and the buffer wheel carries the bird 77 and the bird carrier 17 around to the delivery gate 114, where the carrier and their birds form a queue.

Detection switch 126 which is positioned over the delivery timing wheel 19 detects the metal heads of the screws or metal inserts in the timing wheel so as to determine the position of the timing wheel. The timing wheel is driven in unison with the cut-up line 12. When a timing slot 120 is determined to be in the correct position by the detection switch 126 and a bird carrier is detected at the gate by detection switch 118, the second pressure wheel assembly 128 is activated and cylinder 116 of delivery gate 114 retracts the gate element 115 from engagement with the timing post 90 of the awaiting bird carrier 17, so that the bird carriers in the queue of bird carriers are free to move with the buffer wheel 15. When the first bird carrier moves beyond the gate 114, the second of the two detection switches 118 at the delivery gate detects the passage of the timing post beyond the gate, causing the gate to close, as well as deactivating the second pressure wheel assembly 128.

In the meantime, the bird carrier that has been released from the delivery gate 114 moves into engagement with delivery timing wheel 19, with its timing post being received in a timing slot 120. Since the delivery timing wheel is driven by the cut-up line, a bird will be moved on carrier 17, along with a shackle on the cut-up line, into the delivery area 20 between the buffer wheel and the cut-up line in timed relationship with the movement of a carrier 17 and its bird 77 into the delivery area, where the cam 125 will push the legs of the bird 77 out of the carrier 17 and into the shackle 124 of the cut-up line.

Under normal conditions, the buffer wheel will be operated at a faster peripheral speed than either the weigh line 11 or cut-up line 12, and there will always be a queue of birds 77 at the delivery gate 114. However, should there not be enough birds 77 approaching the transfer system on the weigh line 11, the bird carrier 17 will not be released from the inlet gate 106. This usually means that additional empty bird carriers 17 will form a larger queue of bird carriers at the inlet gate 106.

While a preferred embodiment of the invention has been disclosed in the foregoing specification, it will be understood by those skilled in the art that variations and modifications thereof can be made without departing from the spirit and scope of the invention as set forth in the following claims.

We claim:

1. A method of transferring birds from the shackles of a first suspended conveyor line to the shackles of a second suspended conveyor line, both of the conveyor lines including a series of shackles holding the birds in an inverted attitude by their legs, said method comprising:

continuously rotating a buffer wheel about an upright axis, mounting a plurality of bird carriers in an upwardly facing annular slot formed at the periphery of the buffer wheel, carrying each of said bird carriers at the periphery of the buffer wheel past an entrance area and a delivery area adjacent the buffer wheel, holding each of said bird carriers with the friction between the bird carrier and the buffer wheel in a fixed position on the buffer wheel as the buffer wheel rotates;

blocking the movement of the bird carriers at a first gate located at the entrance area;

moving birds on a first suspended conveyor line into peripheral relationship with the buffer wheel at the entrance area;

releasing a bird carrier from the first gate and moving the released bird carrier with the buffer wheel to the entrance area in timed relationship with a bird moving to the entrance area on the first suspended conveyor line;

transferring the bird from the first suspended conveyor line to the bird carrier at the entrance area;

moving the bird carrier and its bird with the buffer wheel from the entrance area toward the delivery area to a second gate;

blocking the movement of the bird carrier and its bird at the second gate;

moving empty shackles on a second suspended conveyor line into peripheral relationship with the buffer wheel at the delivery area;

releasing a bird carrier and its bird from the second gate;

moving with the buffer wheel the released bird carrier and its bird to the delivery area in timed relationship with a shackle of the second suspended conveyor line; and transferring the bird from the bird carrier to the shackle of the second suspended conveyor line at the delivery area.

2. The method of transferring birds as set forth in claim 1 and wherein the steps of blocking the movement of the bird carrier at the first and second gates comprises:

moving an obstruction into the path of a bird carrier as the buffer wheel continues to rotate and sliding the bird carrier with respect to the buffer wheel along the annular slot of the buffer wheel.

3. The method of transferring birds as set forth in claim 1 and wherein each of said bird carriers includes a pair of leg receiving receptacles and wherein the step of transferring the bird from the first suspended conveyor line to the bird carrier comprises:

pushing the legs of the bird at levels above and below the bird carrier from the shackle of the first suspended conveyor line into the leg receiving receptacles of the bird carrier.

4. The method of transferring birds as set forth in claim 1 and wherein each bird carrier comprises a plate resting on the periphery of the buffer wheel with a generally arcuate guide means extending downwardly from the plate into said annular slot of the buffer wheel and a timing post extending upwardly from the plate, and wherein the steps of blocking the movement of the bird carriers comprises:

moving an obstruction into the path of the timing post to stop the movement of the bird carrier, and sliding the guide means of the bird carrier in the annular slot of the buffer wheel as the buffer wheel continues to rotate with respect to the bird carrier.

5. The method of transferring birds as set forth in claim 1 and wherein the step of moving the released bird carrier with the buffer wheel to the entrance area in timed relationship with a bird moving to the entrance area on the first suspended conveyor line comprises:

rotating a timing wheel with the movement of the first suspended conveyor line in overlying relationship with the periphery of the buffer wheel at the entrance area, and engaging each bird carrier released from the first gate with a recess of the timing wheel to move the released bird carrier to the entrance area in timed relationship with a shackle of the first suspended conveyor line.

6. The method of transferring birds as set forth in claim 1 and wherein the step of moving the released bird carrier and its bird with the buffer wheel to the delivery area in timed relationship with the shackle of the second suspended conveyor line comprises:

rotating a timing wheel with the movement of the second suspended conveyor line in overlying relationship with the periphery of the buffer wheel at the delivery area, and engaging each bird carrier released from the second gate with a recess of the timing wheel to move the released bird carrier to the delivery area in timed relationship with a shackle of the second suspended conveyor line.

7. A bird transfer apparatus for transferring birds from shackles of a first suspended conveyor line to the shackles of a second suspended conveyor line, both of the conveyor lines including a series of shackles holding the birds in an inverted attitude by their legs, said transfer apparatus comprising:

a wheel member rotatable about an upright axis and having a perimeter portion movable through a bird receiving area and a bird delivery area;

annular guide means extending about the perimeter portion of said wheel member, said annular guide means comprising an upwardly facing annular groove formed in said wheel member;

a plurality of bird carriers movably mounted on the perimeter portion of said wheel member and each of said bird carriers including a follower means engaged with said guide means for guiding said bird carrier along the perimeter portion of said wheel member, said follower means comprising a protrusion extending from said bird carrier into said annular groove;

first gate means positioned at one edge portion of said wheel member for selectively blocking the movement of a bird carrier toward the bird receiving area; and a second gate means positioned at another edge portion of said wheel member for selectively blocking the movement of a bird carrier toward the bird delivery area.

8. The bird transfer apparatus of claim 7 and wherein:

said annular guide means further comprises an outwardly facing annular groove formed in said wheel member, and wherein the ends of said bird carriers opposite the ends of said bird carrier carrying the bird are mounted within said outwardly facing groove.

9. The bird transfer apparatus of claim 8 wherein said first gate and said second gate each has a pressure wheel assembly arranged to press the bird carriers into engagement with said buffer wheel to cause the bird carrier to move with said buffer wheel.

10. The bird transfer apparatus of claim 9 wherein said pressure wheel assembly comprises:

a pressure wheel;

a flexible one piece tire disposed on the periphery of said wheel;

a bracket having first and second ends, said first end of said bracket pivotally supporting said pressure wheel on said wheel member above said outwardly facing annular guide means, said second end of said bracket having a pad mounted thereon;

a cylinder disposed above said bracket, said cylinder having a cylinder rod in registry with said pad;

whereby said cylinder is activated in response to the opening of said first or second gate, respectively, and extends said cylinder rod downward into engagement with said pad to yieldably compress said pressure wheel and said outwardly facing annular groove so that the bird carrier adjacent the bird carrier blocked at said gate is held in a fixed position on the periphery of said wheel member and moves the released bird carrier through the gate.

11. The bird transfer apparatus of claim 7 and further including timing wheels mounted in overlying tangential alignment with said wheel member at the entrance area and at the delivery area, each of said timing wheels defining a series of equally spaced timing slots formed in its peripheral portion, and wherein each of said bird carriers includes a timing post sized and shaped to be received in one of said timing slots of each timing wheel, whereby the timing post of each bird carrier is received in a timing slot of a timing wheel as the bird carrier moves through the entrance area and the delivery area.

12. A method of transferring birds from the shackles of a first suspended conveyor line to the shackles of a second suspended conveyor line, both of the conveyor lines including a series or shackles holding the birds in an inverted attitude by their legs, said method comprising:

continuously rotating a buffer wheel about an upright axis, carrying a plurality of bird carriers at the periphery of the buffer wheel past an entrance area and a delivery area adjacent the buffer wheel;

blocking the movement of the bird carriers at a first gate located at the entrance area;

moving birds on a first suspended conveyor line into peripheral relationship with the buffer wheel at the entrance area;

releasing a bird carrier from the first gate and urging an adjacent bird carrier into engagement with said buffer wheel to move the released bird carrier with the buffer wheel to the entrance area in timed relationship with a bird moving to the entrance area on the first suspended conveyor line;

transferring the bird from the first suspended conveyor line to the bird carrier at the entrance area;

moving the bird carrier and its bird with the buffer wheel from the entrance area toward the delivery area to a second gate;

blocking the movement of the bird carrier and its bird at the second gate;

moving empty shackles on a second suspended conveyor line into peripheral relationship with the buffer wheel at the delivery area;

releasing a bird carrier and its bird from the second gate and urging an adjacent bird carrier into engagement with said buffer wheel to move the released bird carrier and its bird with the buffer wheel to the delivery area in timed relationship with a shackle of the second suspended conveyor line; and transferring the bird from the bird carrier to the shackle of the second suspended conveyor line at the delivery area.

13. The method of transferring birds as set forth in claim 12, wherein the step of carrying a plurality of bird carriers at the periphery of the buffer wheel comprises;

mounting each bird carrier into an upwardly facing annular slot formed at the periphery of the buffer wheel and utilizing friction between the bird carrier and the buffer wheel to hold the bird carrier in a fixed position on the buffer wheel as the buffer wheel rotates.

14. The method of transferring birds of claim 13, further comprising the step or mounting the end of each bird carrier opposite the end carrying a bird in an outwardly facing annular guide slot formed at the periphery of the buffer wheel.

15. The method of transferring birds as set forth in claim 14, and wherein the step of moving the released bird carrier and compressing an adjacent bird carrier further comprises the steps of:

extending a cylinder rod downward into engagement with a pressure wheel bracket;

compressing a pressure wheel supported in said bracket on said buffer wheel above said annular guide slot;

then compressing said outwardly facing annular guide slot disposed on the periphery of said buffer wheel downward onto the adjacent bird carrier so that said bird carrier is held on said buffer wheel in a fixed position on the periphery of said buffer wheel;

moving the released bird carrier through said first or second gates, respectively.

16. The method of transferring birds as set forth in claim 13, and wherein the steps of blocking the movement of the bird carrier at the first and second gates comprises:

moving an obstruction into the path of a bird carrier as the buffer wheel continues to rotate and sliding the bird carrier with respect to the buffer wheel along the annular slot of the buffer wheel.

17. The method of transferring birds as set forth in claim 12 and wherein each of said bird carriers includes a pair of leg receiving receptacles and wherein the step of transferring the bird from the first suspended conveyor line to the bird carrier comprises:

pushing the legs of the bird at levels above and below the bird carrier from the shackle of the first suspended conveyor line into the leg receiving receptacles of the bird carrier.

18. The method of transferring birds as set forth in claim 12 and wherein each bird carrier comprises a plate resting on the periphery of the buffer wheel with a generally arcuate guide means extending downwardly from the plate into said annular slot of the buffer wheel and a timing post extending upwardly from the plate, and wherein the steps of blocking the movement of the bird carriers comprises:

moving an obstruction into the path of the timing post to stop the movement of the bird carrier, and sliding the guide means of the bird carrier in the annular slot of the buffer wheel as the buffer wheel continues to rotate with respect to the bird carrier.

19. The method of transferring birds as set forth in claim 12 and wherein the step of moving the released bird carrier and its bird with the buffer wheel to the delivery area in timed relationship with the shackle of the second suspended conveyor line comprises:

rotating a timing wheel with the movement of the second suspended conveyor line in overlying relationship with the periphery of the buffer wheel at the delivery area, and engaging each bird carrier released from the second gate with a recess of the timing wheel to move the released bird carrier to the delivery area in timed relationship with a shackle of the second suspended conveyor line.

* * * * *